United States Patent
Chan

(10) Patent No.: US 9,319,186 B1
(45) Date of Patent: Apr. 19, 2016

(54) RECEIVER EYE-MONITOR CIRCUIT AND METHOD

(71) Applicant: ALTERA CORPORATION, San Jose, CA (US)

(72) Inventor: Allen K. Chan, San Jose, CA (US)

(73) Assignee: Altera Corporation, San Jose, CA (US)

( * ) Notice: Subject to any disclaimer, the term of this patent is extended or adjusted under 35 U.S.C. 154(b) by 99 days.

(21) Appl. No.: 14/245,655

(22) Filed: Apr. 4, 2014

(51) Int. Cl.
*H04L 1/20* (2006.01)
*H04L 27/01* (2006.01)
*H04L 25/03* (2006.01)

(52) U.S. Cl.
CPC ............ *H04L 1/20* (2013.01); *H04L 25/03019* (2013.01); *H04L 25/03885* (2013.01); *H04L 27/01* (2013.01)

(58) Field of Classification Search
CPC ............ H04L 25/03057; H04L 1/203; H04L 2025/03356; H04L 25/0307; H04L 25/03885; H04L 27/01; H04L 1/20; H04L 25/03019; H03K 5/082
USPC ........................................................ 714/776
See application file for complete search history.

(56) References Cited

U.S. PATENT DOCUMENTS

| | | | | |
|---|---|---|---|---|
| 6,011,435 A * | 1/2000 | Takeyabu | ............ | H03F 3/45475 330/252 |
| 6,701,466 B1 * | 3/2004 | Fiedler | ............ | H03L 7/081 714/699 |
| 6,757,327 B1 * | 6/2004 | Fiedler | ............ | H03H 7/40 375/232 |
| 7,643,576 B2 * | 1/2010 | Lai | ............ | H03K 3/356043 375/316 |
| 7,698,669 B1 | 4/2010 | Chow | | |
| 7,936,809 B2 | 5/2011 | Daxer et al. | | |
| 8,451,883 B1 | 5/2013 | Ding et al. | | |
| 8,694,837 B1 * | 4/2014 | Qian | ............ | H04L 1/203 714/704 |
| 8,751,880 B2 * | 6/2014 | Valliappan | ............ | H04L 7/0331 714/700 |
| 2002/0196510 A1 * | 12/2002 | Hietala | ............ | H04L 1/004 398/202 |
| 2005/0058234 A1 * | 3/2005 | Stojanovic | ............ | H04L 7/0334 375/371 |
| 2005/0201491 A1 * | 9/2005 | Wei | ............ | H04L 7/0337 375/326 |
| 2008/0013609 A1 | 1/2008 | Daxer et al. | | |
| 2010/0008414 A1 * | 1/2010 | Lee | ............ | H04L 25/0307 375/233 |
| 2010/0046600 A1 * | 2/2010 | Zerbe | ............ | H04L 25/03343 375/233 |
| 2010/0246657 A1 * | 9/2010 | Ou | ............ | H04L 25/03057 375/232 |
| 2011/0292990 A1 * | 12/2011 | Flynn | ............ | G01R 13/0272 375/229 |
| 2011/0299585 A1 * | 12/2011 | Tomita | ............ | H04L 25/03057 375/236 |

* cited by examiner

*Primary Examiner* — James C Kerveros
(74) *Attorney, Agent, or Firm* — Okamoto & Benedicto LLP

(57) ABSTRACT

One embodiment relates to a method performed by on-die instrumentation. Speculative-high and speculative-low error signals are generated using first and second sense amplifiers. The speculative-high and speculative-low error signals are deserialized to generate speculative-high and speculative-low error data. A subset of bits in the speculation-high and speculation-low error data are determined to be invalid based on prior bits in recovered data obtained using a clock-data recovery and decision feedback equalizer circuit. Another embodiment relates to an integrated circuit with on-die instrumentation for obtaining bit error data for an eye-opening diagram. The integrated circuit includes a voltage multiplexer, a clock multiplexer and first and second sense amplifiers. Other embodiments, aspects and features are also disclosed.

25 Claims, 6 Drawing Sheets

RECEIVER EYE-MONITOR CIRCUIT AND METHOD

BACKGROUND

1. Technical Field

The present invention relates generally to data communications. More particularly, the present invention relates to circuitry for data links.

2. Description of the Background Art

High-speed data links are used to communicate data between devices in a system. Serial interface protocols have been developed at increasingly fast data rates for such data links.

On-die instrumentation (ODI) has become increasingly important for high-speed data links, particularly when off-chip probing may not reveal the exact receiver waveforms. ODI provides visibility to the receive side data after equalization. Using ODI, an eye-opening view of chip performance may be obtained so as to assist in configuring the receiver for optimum data sampling.

SUMMARY

One embodiment relates to a method performed by on-die instrumentation. Speculative-high and speculative-low error signals are generated using first and second sense amplifiers. The speculative-high and speculative-low error signals are deserialized to generate speculative-high and speculative-low error data. A subset of bits in the speculation-high and speculation-low error data are determined to be invalid based on prior bits in recovered data obtained using a clock-data recovery and decision feedback equalizer circuit.

Another embodiment relates to an integrated circuit with on-die instrumentation for obtaining bit error data for an eye-opening diagram. The integrated circuit includes at least a voltage multiplexer, a clock multiplexer, and first and second sense amplifier circuits. A voltage multiplexer selects a reference voltage from a higher reference voltage and a lower reference voltage. The clock multiplexer selects a clock signal from an even clock signal and an odd clock signal. The first sense amplifier circuit slices an input data signal using a first slicing voltage at times indicated by said clock signal to generate a speculative-high error signal. The second sense amplifier circuit slices the input data signal using a second slicing voltage at times indicated by said clock signal to generate a speculative-low error signal. The first slicing voltage is obtained by adding a speculative voltage to the reference voltage, while the second slicing voltage is obtained by subtracting a speculative voltage from the reference voltage.

Another embodiment relates to a method of obtaining bit error data for an eye-opening diagram by on-die instrumentation. A reference voltage is selected from a higher reference voltage and a lower reference voltage, and a clock signal is selected from an even clock signal and an odd clock signal. An input data signal is sliced by first and second sense amplifier circuits using first and second slicing voltages, respectively, at times indicated by the clock signal to generate a speculative-high and speculative-low error signals. The first slicing voltage is obtained by adding a speculative voltage to the reference voltage, and the second slicing voltage is obtained by subtracting the speculative voltage from the reference voltage.

Other embodiments, aspects and features are also disclosed herein.

DETAILED DESCRIPTION

Figure 1:
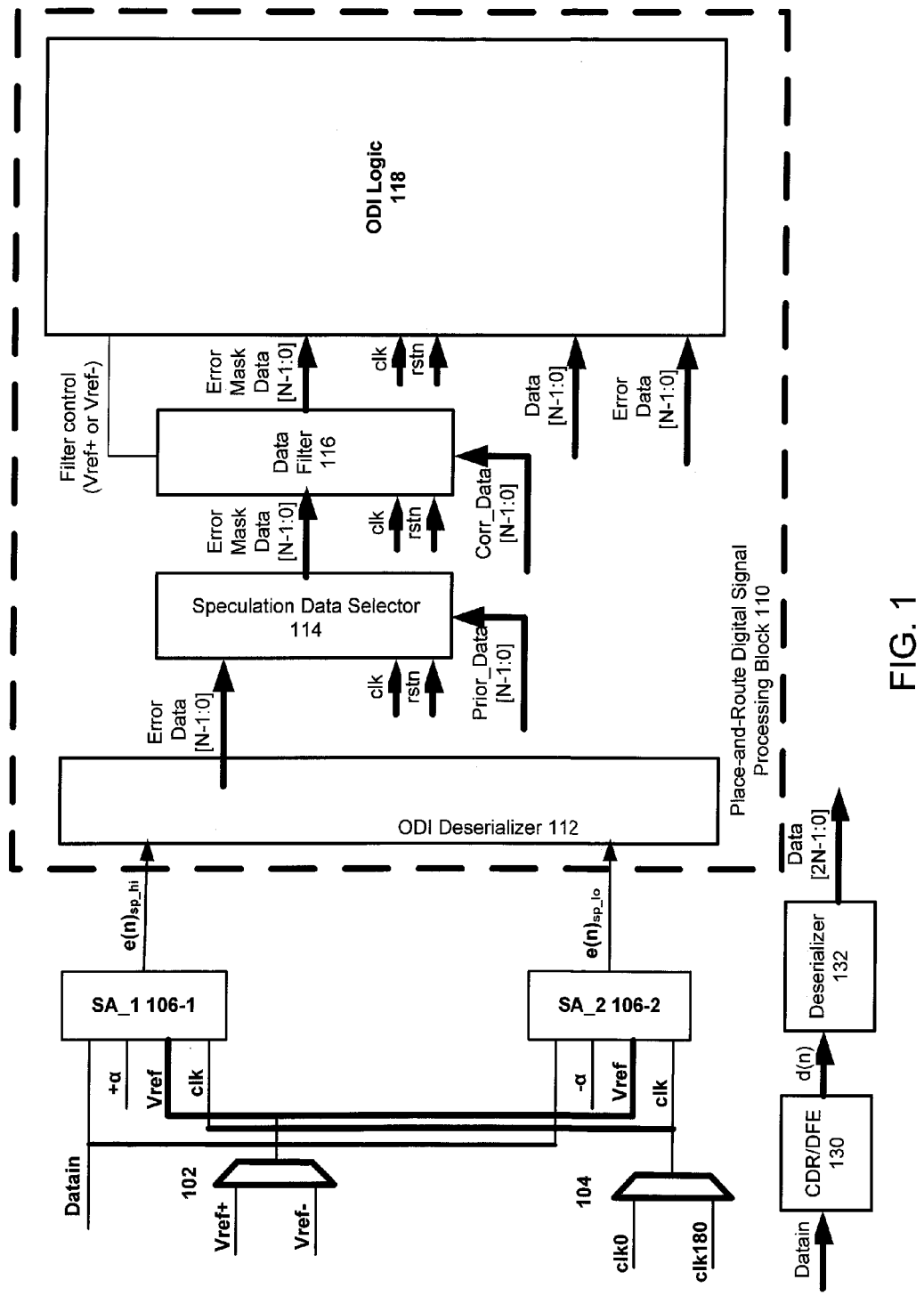
FIG. 1 is a diagram of a transceiver eye-monitor circuit structure in accordance with an embodiment of the invention.

FIG. 1 is a diagram of a transceiver eye-monitor circuit structure in accordance with an embodiment of the invention. As shown, the circuit structure includes a reference voltage multiplexer 102, a clock multiplexer 104, two sense amplifiers (SA_1 106-1 and SA_2 106-2), and a digital signal processing block 110. The digital signal processing block 110 may include an ODI deserializer 112, a speculation data selector 114, a data filter 116, and ODI logic 118.

The voltage multiplexer 102 receives a higher reference voltage, Vref+, and a lower reference voltage, Vref−. In an exemplary implementation, Vref+ and Vref− may be of a same magnitude but different polarities.

The voltage multiplexer 102 may be controlled by the ODI logic 118 so as to select either Vref+ or Vref−. The selected reference voltage (Vref) is output from the voltage multiplexer 102 to the sense amplifier circuits.

Note that the voltage levels of these two reference voltages are controllable. In particular, the vertical sweep for the eye diagram may be performed by stepping Vref+ and Vref− under control of the ODI logic 118. In an exemplary implementation, Vref+ may be stepped from a middle voltage Vref_mid to a maximum voltage Vref_max, while Vref− may be stepped in a corresponding manner from the middle voltage Vref_mid to Vref_min. In an exemplary implementation Vref_mid may be at an electrical ground or zero volts.

The clock multiplexer 104 receives an even clock signal (clk0) and an odd clock signal (clk180). In one implementation, the odd clock signal clk180 may be created by an inverter that receives even clock signal clk0 and outputs the odd clock signal clk180. The clock multiplexer 104 may be controlled by the ODI logic 118 so as to select either clk0 or clk180. The selected clock (clk) is output from the clock multiplexer 104 to the sense amplifier circuits (SA_1 106-1 and SA_2 106-2).

Note that the phases of these clock signals clk0 and clk180 are controllable. In particular, the horizontal sweep for the eye diagram may be performed by stepping phase offsets of these clock signals under control of the ODI logic 118. In an exemplary implementation, the phase offsets may be stepped over a range spanning approximately −90 degrees to +90 degrees.

The first and second sense amplifiers (SA_1 106-1 and SA_2 106-2) each receives an input data signal (Datain), the selected reference voltage (Vref) from the voltage multiplexer 102, and the selected clock (clk). The first sense amplifier SA_1 outputs a speculation-high error signal $e(n)_{sp\_hi}$, and the second sense amplifier SA_2 outputs a speculation-low error signal $e(n)_{sp\_lo}$. In particular, the first sense amplifier SA_1 106-1 generates the speculation-high error signal $e(n)_{sp\_hi}$ by slicing the input data signal at a higher voltage associated with the first-tap speculation feedback H1=+α, and the second sense amplifier SA_2 106-2 generates the speculation-low error signal $e(n)_{sp\_lo}$ by slicing the input data signal at a lower voltage associated with the first-tap speculation feedback signal H1=−α. (The first-tap speculation feedback signal H1=+α conventionally indicates that the previous data bit in the serial data signal was high. The first-tap speculation feedback signal H1=−α conventionally indicates that the previous data bit in the serial data signal was low.)

The partial-response circuit depicted in FIG. 1 may be controllably configured into one of four configurations. Each configuration effectively monitors the data signal Datain for the purpose of generating a portion of the eye diagram.

Even Clock and Higher Reference Voltage

In a first configuration, the clock multiplexer 104 is configured to select the even clock clk0, and the voltage multiplexer 102 is configured to select the higher reference voltage Vref+. Each of the two sense amplifiers SA_1 106-1 and SA_2 106-2 slices the data signal Datain on the even clock clk0 (for example, on the upward transition in clk0) using the upper reference voltage Vref+ to generate the slicing voltage.

More particularly, the first sense amplifier SA_1 106-1 may generate its slicing voltage by adding a speculation voltage α to Vref+, i.e. Vslice_1=Vref++α. Meanwhile, the second sense amplifier SA_2 106-2 may generate its slicing voltage by subtracting a speculation voltage α to Vref+, i.e. Vslice_2=Vref+− α.

In this first configuration, the phase of the even clock signal clk0 may be stepped from −90 degrees to +90 degrees, and the higher reference voltage Vref+ may be stepped from a predetermined middle voltage Vref_mid to a predetermined maximum voltage Vref_max. The stepping of the phase of the even clock signal clk0 and the higher reference voltage Vref+ may be performed so as to cover an upper half of the eye diagram.

In one implementation, at each step of the higher reference voltage Vref+, the phase of the even clock signal clk0 may be stepped from −90 degrees to +90 degrees so as to cover a horizontal slice in the upper half of the eye diagram. In another implementation, at each phase step for the even clock signal clk0, the higher reference voltage Vref+ may be stepped from Vref_mid to Vref_max so as to cover a vertical slice in the upper half of the eye diagram.

Even Clock and Lower Reference Voltage

In a second configuration, the clock multiplexer 104 is configured to select the even clock clk0, and the voltage multiplexer 102 is configured to select the lower reference voltage Vref−. Each of the two sense amplifiers SA_1 106-1 and SA_2 106-2 slices the data signal Datain on the even clock clk0 (for example, on the upward transition in clk0) using the lower reference voltage Vref− to generate the slicing voltage.

More particularly, the first sense amplifier SA_1 106-1 may generate its slicing voltage by adding a speculation voltage α to Vref−, i.e. Vslice_1=Vref−+α. Meanwhile, the second sense amplifier SA_2 106-2 may generate its slicing voltage by subtracting a speculation voltage α to Vref−, i.e. Vslice_2=Vref−− α.

In this second configuration, the phase of the even clock signal clk0 may be stepped from −90 degrees to +90 degrees, and the lower reference voltage Vref− may be stepped from a predetermined middle voltage Vref_mid to a predetermined minimum voltage Vref_min. The stepping of the phase of the even clock signal clk0 and the lower reference voltage Vref− may be performed so as to cover the lower half of the eye diagram.

In one implementation, at each step of the lower reference voltage Vref−, the phase of the even clock signal clk0 may be stepped from −90 degrees to +90 degrees so as to cover a horizontal slice in the lower half of the eye diagram. In another implementation, at each phase step for the even clock signal clk0, the lower reference voltage Vref− may be stepped from Vref_mid to Vref_min so as to cover a vertical slice in the lower half of the eye diagram.

Odd Clock and Higher Reference Voltage

In a third configuration, the clock multiplexer 104 is configured to select the odd clock clk180, and the voltage multiplexer 102 is configured to select the higher reference voltage Vref+. Each of the two sense amplifiers SA_1 106-1 and SA_2 106-2 slices the data signal Datain on the odd clock clk180 (for example, on the upward transition in clk180) using the higher reference voltage Vref+ to generate the slicing voltage.

More particularly, the first sense amplifier SA_1 106-1 may generate its slicing voltage by adding a speculation voltage α to Vref+, i.e. Vslice_1=Vref++α. Meanwhile, the second sense amplifier SA_2 106-2 may generate its slicing voltage by subtracting a speculation voltage α to Vref+, i.e. Vslice_2=Vref+− α.

In this third configuration, the phase of the odd clock signal clk180 may be stepped from −90 degrees to +90 degrees, and the higher reference voltage Vref+ may be stepped from a predetermined middle voltage Vref_mid to a predetermined maximum voltage Vref_max. The stepping of the phase of the odd clock signal clk180 and the higher reference voltage Vref+ may be performed so as to cover the upper half of the eye diagram.

In one implementation, at each step of the higher reference voltage Vref+, the phase of the odd clock signal clk180 may be stepped from −90 degrees to +90 degrees so as to cover a horizontal slice in the upper half of the eye diagram. In another implementation, at each phase step for the odd clock signal clk180, the higher reference voltage Vref+ may be stepped from Vref_mid to Vref_max so as to cover a vertical slice in the upper half of the eye diagram.

Odd Clock and Lower Reference Voltage

In a fourth configuration, the clock multiplexer 104 is configured to select the odd clock clk180, and the voltage multiplexer 102 is configured to select the lower reference voltage Vref−. Each of the two sense amplifiers SA_1 106-1 and SA_2 106-2 slices the data signal Datain on the odd clock clk180 (for example, on the upward transition in clk180) using the lower reference voltage Vref− to generate the slicing voltage.

More particularly, the first sense amplifier SA_1 106-1 may generate its slicing voltage by adding a speculation voltage α to Vref−, i.e. Vslice_1=Vref−+α. Meanwhile, the second sense amplifier SA_2 106-2 may generate its slicing voltage by subtracting a speculation voltage α to Vref−, i.e. Vslice_2=Vref−− α.

In this fourth configuration, the phase of the odd clock signal clk180 may be stepped from −90 degrees to +90 degrees, and the lower reference voltage Vref− may be stepped from a predetermined middle voltage Vref_mid to a predetermined minimum voltage Vref_min. The stepping of the phase of the odd clock signal clk180 and the lower reference voltage Vref− may be performed so as to cover the lower half of the eye diagram.

In one implementation, at each step of the lower reference voltage Vref−, the phase of the odd clock signal clk180 may be stepped from −90 degrees to +90 degrees so as to cover a horizontal slice in the lower half of the eye diagram. In another implementation, at each phase step for the odd clock signal clk180, the lower reference voltage Vref− may be stepped from Vref_mid to Vref_min so as to cover a vertical slice in the lower half of the eye diagram.

ODI Deserializer

The ODI Deserializer 112 receives the serial output signals $e(n)_{high}$ from SA_1 106-1 and $e(n)_{low}$ from SA_2 106-2. The ODI Deserializer 112 deserializes the serial signals $e(n)_{high}$ and $e(n)_{low}$ to generate the parallel data signals Error_Data_SpecHigh [N-1:0] and Error_Data_SpecLow [N-1:0], respectively.

For example, in one implementation, N=64. More generally, the number N may be a power of two (i.e. N may be 2, 4, 8, 16, 32, 64, 128, 256, and so on).

CDR/DFE

In an exemplary implementation, the clock data recovery/decision-feedback equalization (CDR/DFE) circuitry 130 of the receiver may recover a serial digital data signal d(n) from the analog Datain signal, and the deserializer 132 of the receiver may deserialize the serial recovered data d(n) and output the parallel recovered data Data [2N-1:0].

Speculation Data Selector

The Speculation Data Selector 114 receives Error_Data_SpecHigh [N-1:0] and Error_Data_SpecLow [N-1:0] (together referred to as Error Data [N-1:0] in FIG. 1) and prior recovered data values Prior_Data [N-1:0]. In addition, the Speculation Data Selector 114 may receive the selected clock signal clk and a reset signal rstn.

If clk=clk0 (i.e. the even clock was used to capture Error Data [N-1:0]), then the prior recovered data Prior_Data [N-1:0] corresponds to odd data bits captured by the CDR/DFE. These odd data bits are the bits captured by the CDR/DFE 130 at the odd clock transitions that precede the even clock transitions used to capture the error data.

On the other hand, if clk=clk180 (i.e. the odd clock was used to capture Error Data [N-1:0]), then the prior recovered data Prior_Data [N-1:0] corresponds to even data bits captured by the CDR/DFE. These even data bits are the bits captured by the CDR/DFE at the even clock transitions that precede the odd clock transitions used to capture the error data.

The Speculation Data Selector 114 uses the bit values given by Prior_Data [N-1:0] to determine the valid and invalid speculation error data in Error_Data_SpecHigh [N-1:0] and Error_Data_SpecLow [N-1:0]. The valid/invalid bits in the speculation error data may be indicated by output signals Error_Mask_SpecHigh [N-1:0] and Error_Mask_SpecLow [N-1:0].

In an exemplary implementation, each bit in Error_Mask_SpecHigh [N-1:0] may indicate whether a corresponding bit in Error_Data_SpecHigh [N-1:0] is valid or invalid, and each bit in Error_Mask_SpecLow [N-1:0] may indicate whether a corresponding bit in Error_Data_SpecLow [N-1:0] is valid or invalid. For example, if Prior_Data [n] is high, then Error_Mask_SpecHigh [n] may be set to 1 to indicate that Error_Data_SpecHigh [n] is valid, and Error_Mask_SpecLow [n] may be reset to 0 to indicate that Error_Data_SpecLow [n] is invalid. On the other hand, if Prior_Data [n] is low, then Error_Mask_SpecHigh [n] may be reset to 0 to indicate that Error_Data_SpecHigh [n] is invalid, and Error_Mask_SpecLow [n] may be set to 1 to indicate that Error_Data_SpecLow [n] is valid.

Data Filter

The Data Filter 116 receives the Error_Mask_SpecHigh [N-1:0] and Error_Mask_SpecLow [N-1:0] signals from the Speculation Data Selector 114 and corresponding recovered data values Corr_Data [N-1:0]. In addition, the Data Filter 116 may receive the selected clock signal clk, and a reset signal rstn, and a filter control signal from the ODI Logic 118. The filter control signal may indicate to the Data Filter 116 whether Vref+ or Vref– was selected by the voltage multiplexer 102 in capturing the error data.

Corr_Data [N-1:0] provides the data values recovered by the CDR/DFE 130 that correspond to the error data Error Data [N-1:0]. If clk=clk0 (i.e. transitions in the even clock were used to capture the error data Error Data [N-1:0]), then the corresponding recovered data values Corr_Data [N-1:0] are the corresponding data bits captured by the CDR/DFE 130 at the same even clock transitions. On the other hand, if clk=clk180 (i.e. transitions in the odd clock were used to capture the error data Error Data [N-1:0])), then the corresponding recovered data values Corr_Data [N-1:0] are the corresponding data bits captured by the CDR/DFE 130 at the same odd clock transitions.

If Vref+ was selected, then the Data Filter 116 may change the error mask data to filter out as invalid those bits in Error Data [N-1:0] corresponding to low bits in Corr_Data [N-1:0]. This is because the use of Vref+ as the slicing voltage to find bit errors should be valid only for a high data signal.

On the other hand, if Vref– was selected, then the Data Filter 116 may change the error mask data to filter out as invalid those bits in the error data corresponding to high bits in the recovered data values. This is because the use of Vref– as the slicing voltage to find bit errors should be valid only for a low data signal.

ODI Logic

In accordance with an embodiment of the invention, the ODI Logic 118 controls the various circuit components of the ODI system. The ODI Logic 118 controls which reference voltage (Vref+ or Vref–) is selected by the voltage multiplexer 102 and which clock signal (clk or clk180) is selected by the clock multiplexer 104. In addition, the ODI Logic 118 may control the stepping of the reference voltages, and the phase offsets (phase shifts) $\phi$ of the clock signals.

The ODI Logic 118 receives the error mask data, along with the error data and the corresponding recovered data from the CDR/DFE. The ODI Logic 118 uses the error mask data to determine the valid error data and compares bits of the valid error data against the corresponding bits of the data input to determine bit errors.

The ODI Logic 118 may increment a bit error count (BEC) for each bit comparison that indicates a bit error. In addition, the ODI Logic 118 may increment a total bit count for each bit comparison made. The ODI Logic 118 may then compute a bit error rate (BER) by dividing the bit error count by the total bit count.

The BEC (or BER) may be stored for each phase-voltage ($\phi$, Vref) bin. Note that, in an exemplary implementation, the BECs (or BERs) for even and odd clocks with the same phase offset $\phi$ and the same reference voltage Vref may be combined (or averaged) into a same phase-voltage ($\phi$, Vref) bin.

A two-dimensional "eye-opening" diagram may be generated by plotting the BECs (or BERs) for phase-voltage bins spanning a range of phase offsets $\phi$ and a range of reference voltages Vref. An example of such an eye-opening diagram generated by an embodiment of the present invention is shown in FIG. 2.

Figure 2:
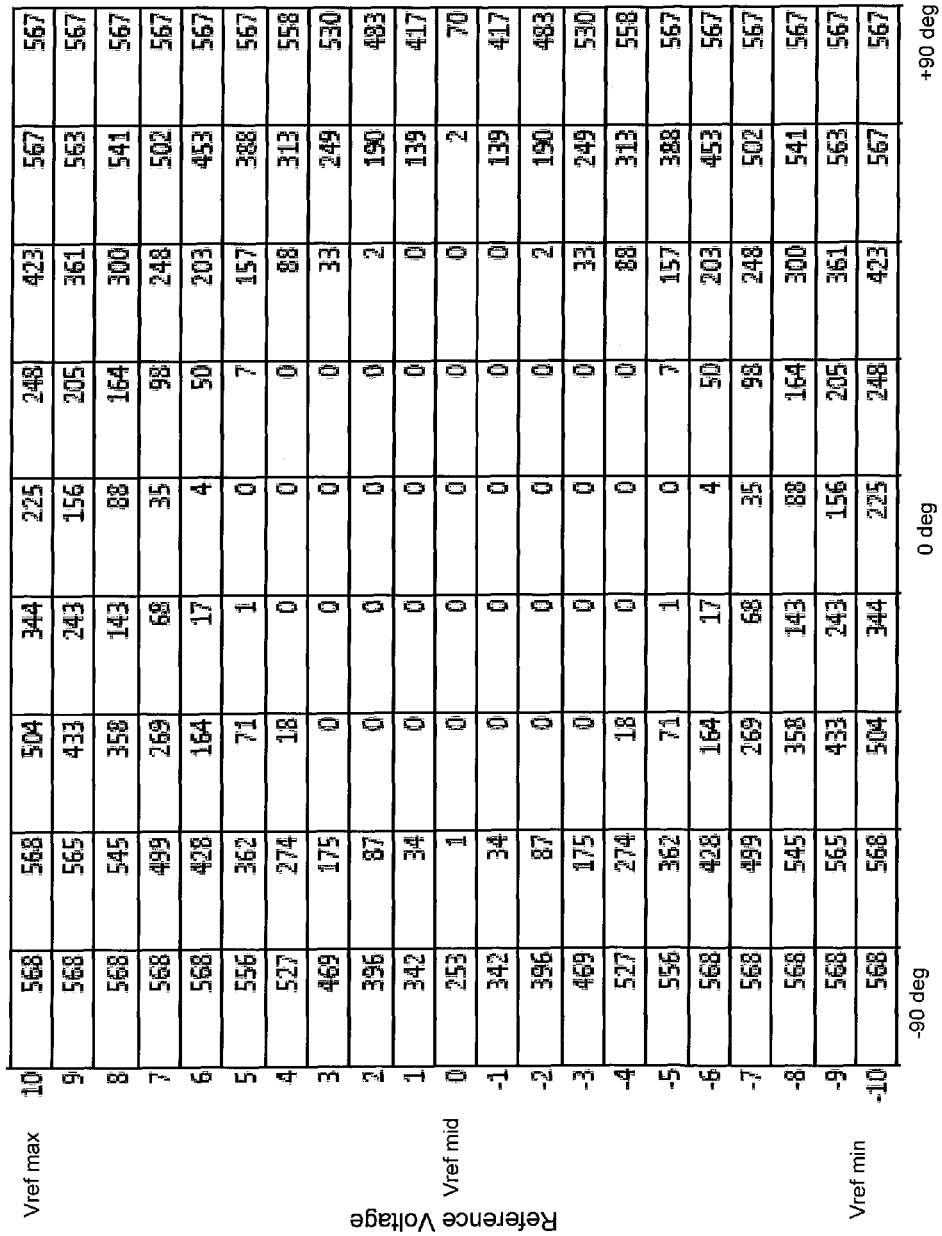
FIG. 2 is an example transceiver eye-opening diagram obtained in accordance with an embodiment of the invention.

The eye-opening diagram in FIG. 2 is generated using the error mask data output by the Data Filter 116. Bit error counts are shown for phase-voltage ($\phi$, Vref) bins. As shown on the x-axis, the phase offset of the bins may span a range from approximately –90 degrees to approximately +90 degrees. As shown on the y-axis, the reference voltage of the bins may span a range from Vref_min to Vref_max.

In the eye-opening diagram shown in FIG. 2, the bit error counts for even and odd clocks with the same phase offset and for higher and lower reference voltages having equivalent voltage levels (i.e. where both voltage levels are a same voltage away from a middle level voltage) have been combined into a same phase-voltage bin. In other words, the bit error data for the four above-described configurations have been combined.

Note that combining the bit error data for the reference voltages Vref+ and Vref− at equivalent voltage levels makes a simplifying assumption that there is mirror symmetry in the eye-opening diagram. The mirror symmetry is such that the top and bottom halves of the eye-opening diagram are mirror images of each other. Hence, the top and bottom halves of the eye-opening diagram in FIG. 2 are mirror images of each other.

As seen in FIG. 2, bit error counts are zero in a central region of the two-dimensional array of bins. This central region may be considered to correspond to an "eye opening" for the receiver. Note that this eye-opening diagram is based on bit error count data, while a conventional eye-opening diagram is based on signal traces.

Simple 8-Bit Example

Consider the following simple example with N=8, where the selected reference voltage Vref=Vref+, the selected clock signal clk=clk180, and the phase offset of clk is ϕ. While N=8 in this example, embodiments of the present invention may use different (typically, larger) N values, such as N=64, for example.

The data in this example is shown below.
Corr_Data [7:0]={D7, D6, D5, D4, D3, D2, D1, D0}={1, 1, 0, 0, 0, 0, 1, 1}
Prior_Data [7:0]={P7, P6, P5, P4, P3, P2, P1, P0}={0, 1, 0, 1, 1, 0, 0, 1}
Error_Data_SpecHigh [7:0]={H7, H6, H5, H4, H3, H2, H1, H0}
Error_Data_SpecLow [7:0]={L7, L6, L5, L4, L3, L2, L1, L0}

In this example scenario, the Speculation Data Selector 114 may use the value of P0 to select between H0 and L0. In this case, since P0=1, Error_Mask_SpecHigh [0] is set to 1 (valid) and Error_Mask_SpecLow [0] is set to 0 (invalid). Similarly, the Speculation Data Selector 114 may use the value of P1 to select between H1 and L1. In this case, since P1=0, Error_Mask_SpecHigh [1] is set to 0 (invalid) and Error_Mask_SpecLow [1] is set to 1 (valid). Similarly, for the remaining bits, the Speculation Data Selector 114 may use the value of Dn to select between Hn and Ln, where n=2 through 7.

Hence, in this example scenario, the output of the Speculation Data Selector 114 is as follows:
Error_Mask_SpecHigh [7:0]={0, 1, 0, 0, 1, 1, 0, 1}; and
Error_Mask_SpecLow [7:0]={1, 0, 1, 1, 0, 0, 1, 0}.

The Data Filter 116 changes the error mask data to filter out invalid data based on whether Vref+ or Vref− was used to capture the error data. In this example scenario, Vref+ was used to capture the error data. As such, the Data Filter 116 may filter out as invalid those error bits that correspond to low values in the data. In particular, since Corr_Data [7:0]={1, 1, 0, 0, 0, 0, 1, 1}, the low values in the data are at bit positions 0, 1, 6 and 7. Hence, the error mask data may be changed filter out error data at bit positions 0, 1, 6 and 7 as invalid by resetting the mask bits at those bit positions to be zero (invalid). Thus, the Data Filter 116 may change the error mask data as follows:
Error_Mask_SpecHigh [7:0]={0→0, 1→0, 0, 0, 1, 1, 0→0, 1→0}; and
Error_Mask_SpecLow [7:0]={1→0, 0→0, 1, 1, 0, 0, 1→0, 0→0}.

With the above changes, the Data Filter 116 outputs the following error mask data:
Error_Mask_SpecHigh [7:0]={0, 0, 0, 0, 1, 1, 0, 0}; and
Error_Mask_SpecLow [7:0]={0, 0, 1, 1, 0, 0, 0, 0}.

The ODI Logic 118 may then check for bit errors. In this example, there are four valid bits indicated by the error masks. The ODI Logic 118 checks the corresponding four error data bits against the corresponding recovered data bits.

In particular, since Error_Mask_SpecHigh [2]=1, the ODI Logic 118 compares the value of Error_Data_SpecHigh [2]=H2 against the value of Corr_Data [2]=D2. Since Error_Mask_SpecHigh [3]=1, the ODI Logic 118 compares the value of Error_Data_SpecHigh [3]=H3 against the value of Corr_Data [3]=D3.

Similarly, since Error_Mask_SpecLow [4]=1, the ODI Logic 118 compares the value of Error_Data_SpecLow [4]=L4 against the value of Corr_Data [4]=D4. Lastly, since Error_Mask_SpecLow [5]=1, the ODI Logic 118 compares the value of Error_Data_SpecLow [5]=L5 against the value of Corr_Data [5]=D5.

The ODI Logic 118 may increment a bit error count for each bit comparison that indicates a bit error. In addition, the ODI Logic 118 may increment a total bit count for each bit comparison made. The ODI Logic 118 may then compute a bit error rate (BER) by dividing the bit error count by the total bit count.

The bit error data may be obtained and stored for an array of phase-voltage bins. An eye-opening diagram may then be generated as a two-dimensional chart (such as illustrated in FIG. 2, for example) by plotting the bit error counts (or BERs) for phase-voltage bins spanning a range of phase offsets on an x-axis and a range of reference voltage levels on a y-axis.

Exemplary Method

Figure 3:
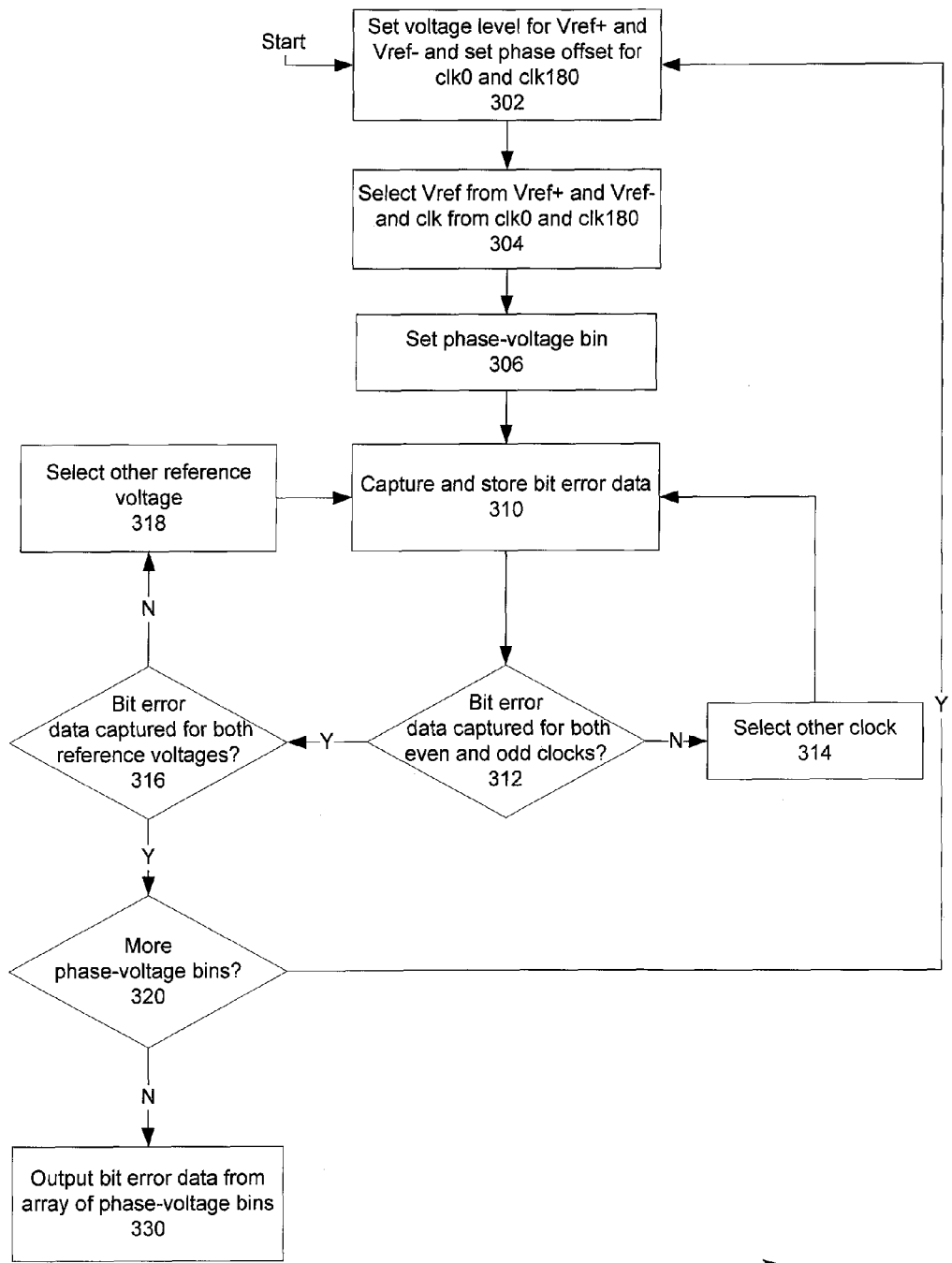
FIG. 3 is a flow chart of a method of generating bit error data for a transceiver eye-opening diagram in accordance with an embodiment of the invention.

FIG. 3 is a flow chart of a method 300 of generating bit error data for a transceiver eye-opening diagram in accordance with an embodiment of the invention. In an exemplary implementation, the method 300 may be performed under control of the ODI Logic 118 described above in relation to FIG. 1.

Per step 302, the method 300 may begin by setting the voltage level for the higher and lower reference voltages (Vref+ and Vref−) and the phase offset for the even and odd clock signals (clk0 and clk180). As depicted in FIG. 2, the upper reference voltage Vref+ may range from Vref_mid to Vref_max, and the lower reference voltage Vref− may range from Vref_mid to Vref_min.

In an exemplary implementation of this step, the reference voltages may be set such that the voltage difference Vref+ and Vref_mid may be the same as the voltage difference between Vref_mid and Vref−. In other words, Vref+ may be above Vref_mid by the same amount that Vref− is below Vref_mid.

Per step 304, selection is made of a reference voltage and a clock signal. In an exemplary implementation, the reference voltage Vref may be selected by the voltage multiplexer 102 from a higher reference voltage Vref+ and a lower reference voltage Vref−, and the clock signal c/k may be selected by the clock multiplexer 104 from the even clock signal clk0 and the odd clock signal clk180.

In other words, one of four configurations may be selected by step 304. In a first configuration, the selected reference voltage is the higher reference voltage Vref+, and the selected clock signal is the even clock signal clk0. In a second configuration, the selected reference voltage is the lower reference voltage Vref−, and the selected clock signal is clk0. In a third configuration, the selected reference voltage is Vref+, and the selected clock signal is the odd clock signal clk180. In a fourth configuration, the selected reference voltage is Vref−, and the selected clock signal is clk180.

Per step 306, a phase-voltage bin may be set. The phase-voltage bin corresponds to a phase-offset/voltage-level pair. The phase-voltage bin is a storage bin that may be used to store the bit error data for the given phase-offset/voltage-level pair.

Per step 310, bit error data may be captured and stored in the phase-voltage bin. An exemplary implementation of the step 310 may involve further method steps depicted in FIG. 4 and described in relation thereto.

Per step 312, a determination may be made as to whether the bit error data for this phase-voltage bin has been captured for both even and odd clocks.

If the bit error data for this phase-voltage bin has not yet been captured for both even and odd clocks, then the other clock may be selected per step 314. For example, if the even clock was selected in step 304, then the odd clock may be selected in step 314, or vice versa. The method 300 may then loop back to step 310 so as to further capture and store bit error data.

On the other hand, if the bit error data for this phase-voltage bin has been captured for both even and odd clocks, then a further determination may be made, per step 316, as to whether the bit error data for this phase-voltage bin has been captured for both Vref+ and Vref−.

If the bit error data for this phase-voltage bin has not yet been captured for both Vref+ and Vref−, then the other reference voltage may be selected per step 318. For example, if Vref+ was selected in step 304, then Vref− may be selected in step 318, or vice versa. The method 300 may then loop back to step 310 so as to further capture and store bit error data.

On the other hand, if the bit error data for this phase-voltage bin has been captured for both Vref+ and Vref−, then a further determination may be made, per step 320, as to whether bit error data is to be captured and collected for more phase-voltage bins.

Bit error data may be captured and collected over a range of phase offsets and a range of reference voltages so as to be able to form an eye-opening diagram from an array of phase-voltage bins, such as depicted in FIG. 2, for example. The phase offset may be stepped over a range of phase offsets so as to collect and store bit error data for a row of phase-voltage bins in an array of phase-voltage bins. The voltage level may be stepped over a range of voltage levels so as to collect and store bit error data for a column of phase-voltage bins in the array of phase-voltage bins.

Figure 4:
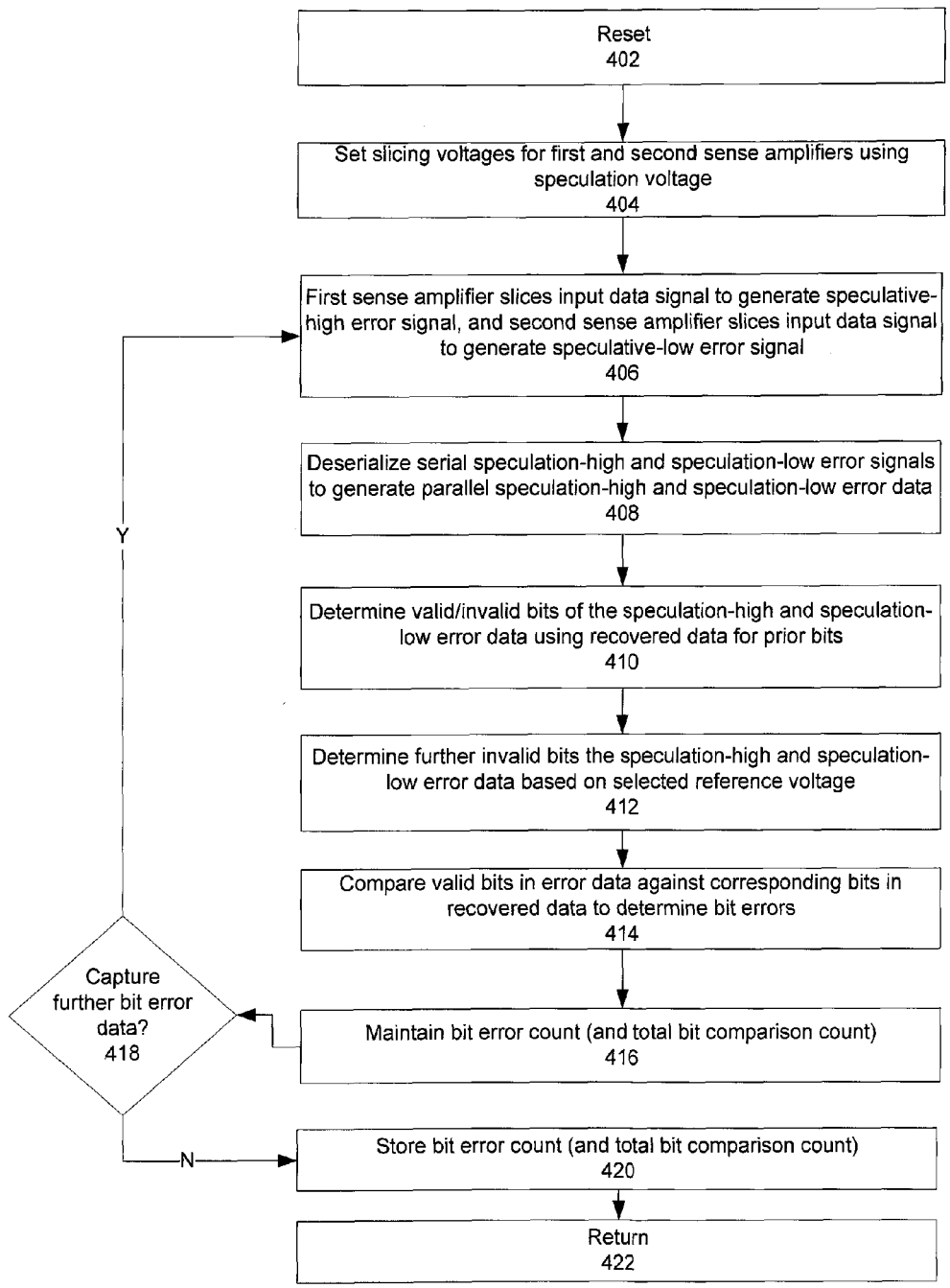
FIG. 4 is a flow chart of a method for capturing and storing bit error data in accordance with an embodiment of the invention.

FIG. 4 is a flow chart of a method 400 for capturing and storing bit error data in accordance with an embodiment of the invention. In an exemplary implementation, the method 400 may be performed by the on-chip circuitry described above in relation to FIG. 1 to capture and store bit error data per step 310 in FIG. 3.

Per step 402, the method 400 may be initiated with a reset. In an exemplary implementation, the reset may involve assertion of a reset signal rstn so as to reset certain circuitry in the digital signal processing block 110 (such as, for example, the speculation data selector 114, the data filter 116, and certain circuitry in the ODI logic 118).

Per step 404, the slicing voltage for the first sense amplifier 106-1 may be set such that the slicing voltage is the selected reference voltage Vref plus a speculation voltage α. This slicing voltage (Vref+α) is appropriate to be used if a preceding bit was high and, hence, may be referred to as a speculation-high slicing voltage. In addition, the slicing voltage for the second sense amplifier 106-2 may be set such that the slicing voltage is the selected reference voltage Vref_minus a speculation voltage α. This slicing voltage (Vref− α) is appropriate to be used if a preceding bit was low and, hence, may be referred to as a speculation-low slicing voltage.

Per step 406, the first sense amplifier 106-1 receives an input data signal and generates a speculative-high error signal $e(n)_{sp\_hi}$ by slicing the input data signal using the speculation-high slicing voltage. In addition, the second sense amplifier 106-2 receives an input data signal and generates a speculative-low error signal $e(n)_{sp\_lo}$ by slicing the input data signal using the speculative-low slicing voltage.

The speculative-high error signal $e(n)_{sp\_hi}$ and the speculative-low error signal $e(n)_{sp\_lo}$ are digital signals. The first sense amplifier 106-1 generates a speculative-high error signal $e(n)_{sp\_hi}$ that is high (logical 1) if the voltage of the input data signal at the clock transition is higher than the speculation-high slicing voltage and low (logical 0) if the voltage of the input data signal at the clock transition is lower than the speculation-high slicing voltage. The second sense amplifier 106-2 generates a speculative-low error signal $e(n)_{sp\_lo}$ that is high (logical 1) if the voltage of the input data signal at the clock transition is higher than the speculative-low slicing voltage and low (logical 0) if the voltage of the input data signal at the clock transition is lower than the speculative-low slicing voltage.

The speculation-high error signal $e(n)_{sp\_hi}$ and speculation-low error signal $e(n)_{sp\_lo}$ may be received from the sense amplifiers by the digital processing block 110. In particular, these error signals may be received by the ODI Deserializer 112 in the digital processing block 110.

Per step 408, the ODI Deserializer 112 deserializes the serial error signals $e(n)_{sp\_hi}$ and $e(n)_{sp\_lo}$ to generate N-bit-wide parallel error signals Error_Data_SpecHigh [N-1:0] and Error_Data_SpecLow [N-1:0], respectively. Together the two parallel error signals are shown as Error_Data [N-1:0] in FIG. 1.

Per step 410, the Speculation Data Selector 114 may determine the valid and invalid speculation error data in Error_Data_SpecHigh [N-1:0] and Error_Data_SpecLow [N-1:0] based on Prior_Data [N-1:0]. The valid/invalid bits in the speculation error data may be indicated by output signals Error_Mask_SpecHigh [N-1:0] and Error_Mask_SpecLow [N-1:0]. In an exemplary implementation, each bit in Error_Mask_SpecHigh [N-1:0] may indicate whether a corresponding bit in Error_Data_SpecHigh [N-1:0] is valid or invalid, and each bit in Error_Mask_SpecLow [N-1:0] may indicate whether a corresponding bit in Error_Data_SpecLow [N-1:0] is valid or invalid.

Per step 412, the Data Filter 116 modifies the error masks Error_Mask_SpecHigh [N-1:0] and Error_Mask_SpecLow [N-1:0] so as to filter out further invalid speculation error data. If the filter control signal indicates that Vref+ was selected to capture the error data, then the Data Filter 116 may change the error mask data to filter out as invalid those bits in the error data corresponding to low bits in the data input. On the other hand, if the filter control signal indicates that Vref− was selected to capture the error data, then the Data Filter 116 may change the error mask data to filter out as invalid those bits in the error data corresponding to high bits in the data input.

Per step 414, the ODI Logic 118 may use the error masks Error_Mask_SpecHigh [N-1:0] and Error_Mask_SpecLow [N-1:0] to determine valid bit comparisons to be made between Error_Data [N-1:0] and Corr_Data [N-1:0].

Per step 416, the bit error count from the valid bit comparisons may be tracked and stored in a phase-voltage bin. The phase-voltage bin may be associated a particular phase offset φ of the clock clk and a particular voltage level for the reference voltage Vref. In addition, a total count of the valid bit comparisons made (whether or not a bit error is indicated) may also be tracked and stored in the phase-voltage bin so that a bit error rate may be computed.

Per step 418, a determination may be made as to whether further bit error data is to be captured in this instance. For example, further bit error data may be captured until the total count of valid bit comparisons reaches a predetermined threshold. If further bit error data is to be captured in this instance, then the method 400 may effectively loop back to step 406 so as to continue to generate the error signals.

Otherwise, if no further bit error data is to be captured in this instance, then, per step 420, the bit error count (and, optionally, the total count of valid bit comparisons) may be stored in the phase-offset bin. Thereafter, the method 400 may end (i.e. return to the calling procedure) per step 422.

Advantages and Trade-Offs

The present disclosure addresses bandwidth limitations that are intrinsic in a conventional speculation summation node for on-die instrumentation (ODI) logic. As taught herein, by reducing the number of sense amplifiers in the summation node, the parasitic capacitance and kick-back noise may be decreased to achieve high data rate (for example, 28 Gbps or higher) design specifications.

Advantageously, the presently-disclosed circuit structure substantially reduces the number of sense amplifiers and high-speed multiplexers required in the speculation summation node. The summation node for a conventional full-response half-rate speculation architecture requires eight sense amplifiers and six high-speed multiplexers. In contrast, the presently-disclosed circuit structure requires only two sense amplifiers at the summation node for a partial-response half-rate speculation architecture.

As a trade-off, complexity is added to digitally process the data from the reduced number of sense amplifiers. As disclosed herein, this digital processing may be performed by digital signal processing circuitry (for example, an ODI deserializer 112, a speculation data selector 114, and a data filter 116) before the on-die instrumentation logic block (ODI Logic 118).

A conventional speculation architecture uses speculation tap feedback which disadvantageously requires circuitry to fan-out the speculation tap feedback signal to the ODI circuit. This may result in excessive loading of the speculation tap feedback signal and limit the data rate of the DFE and ODI circuits. The presently-disclosed circuit structure advantageously does not require speculation tap feedback and so avoids the excessive loading of this critical signal.

Example FPGA

Figure 5:
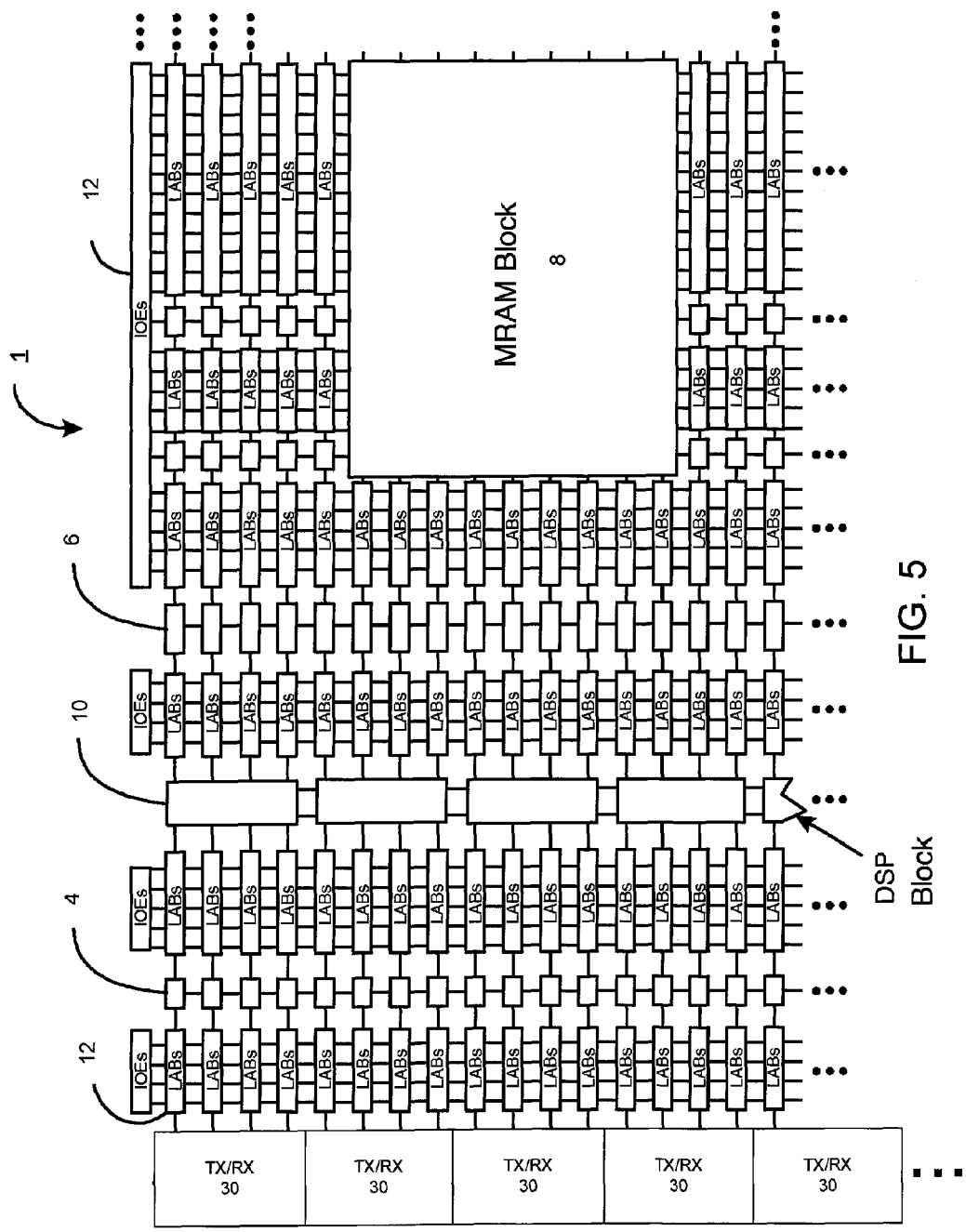
FIG. 5 is a simplified partial block diagram of a field programmable gate array (FPGA) that can include aspects of the present invention.

FIG. 5 is a simplified partial block diagram of a field programmable gate array (FPGA) 1 that can include aspects of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 1 includes within its "core" a two-dimensional array of programmable logic array blocks (or LABs) 2 that are interconnected by a network of column and row interconnect conductors of varying length and speed. LABs 2 include multiple (e.g., ten) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 1 may also include a distributed memory structure including random access memory (RAM) blocks of varying sizes provided throughout the array. The RAM blocks include, for example, blocks 4, blocks 6, and block 8. These memory blocks can also include shift registers and FIFO buffers.

FPGA 1 may further include digital signal processing (DSP) blocks 10 that can implement, for example, multipliers with add or subtract features. Input/output elements (IOEs) 12 located, in this example, around the periphery of the chip support numerous single-ended and differential input/output standards. Each IOE 12 is coupled to an external terminal (i.e., a pin) of FPGA 1. Transceiver (TX/RX) channel circuits 30 may also be provided with each TX/RX channel circuit 30 being coupled to several LABs.

It is to be understood that FPGA 1 is described herein for illustrative purposes only and that the present invention can be implemented in many different types of PLDs, FPGAs, and ASICs.

Example Digital System

Figure 6:
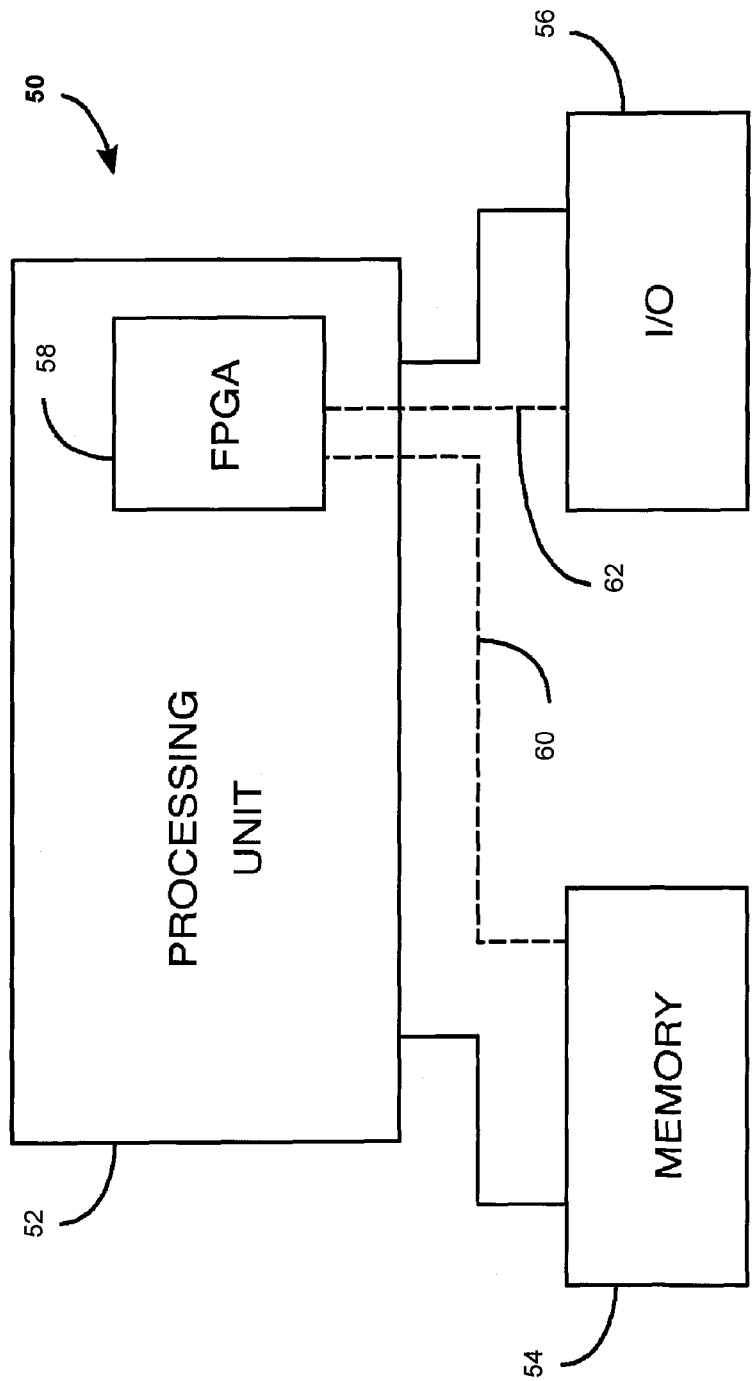
FIG. 6 is a block diagram of an exemplary digital system that can employ techniques of the present invention.

FIG. 6 shows a block diagram of an exemplary digital system 50 that can embody techniques of the present invention. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

CONCLUSION

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. An integrated circuit with on-die instrumentation for obtaining bit error data for an eye-opening diagram, the integrated circuit comprising:
    a voltage multiplexer for selecting a reference voltage from a high reference voltage and a low reference voltage;
    a clock multiplexer for selecting a clock signal from an even clock signal and an odd clock signal;
    a first sense amplifier circuit for slicing an input data signal using a first slicing voltage at times indicated by said clock signal to generate a speculative-high error signal, wherein said first slicing voltage comprises said reference voltage increased by a speculative voltage; and
    a second sense amplifier circuit that slices the input data signal using a second slicing voltage at times indicated by said clock signal to generate a speculative-low error signal, wherein said second slicing voltage comprises said reference voltage reduced by the speculative voltage.

2. The integrated circuit of claim 1, further comprising:
    a deserializer that deserializes the speculative-high and speculation-low error signals and outputs speculation-high and speculation-low error data.

3. The integrated circuit of claim 1, further comprising:
    a speculation data selector for determining bits in the speculation-high and speculation-low error data that are invalid due to incorrect speculation, wherein the incorrect speculation is determined based on prior bits in recovered data obtained using a clock-data recovery and decision feedback equalizer circuit.

4. The integrated circuit of claim 3, wherein the speculation data selector outputs speculation-high and speculation-low error masks that indicate the bits in the speculation-high and speculation-low error data that are invalid due to the incorrect speculation.

5. The integrated circuit of claim 3, further comprising:
    a data filter for determining bits in the speculation-high and speculation-low error data that are invalid due to an incorrect reference voltage, wherein the incorrect reference voltage is determined based on corresponding bits in the recovered data obtained using the clock-data recovery and decision feedback equalizer circuit.

6. The integrated circuit of claim 5, wherein the speculation data selector outputs speculation-high and speculation-low error masks that indicate the bits in the speculation-high and speculation-low error data that are invalid due to incorrect speculation, and wherein the data filter modifies the speculation-high and speculation-low error masks to indicate the bits in the speculation-high and speculation-low error data that are invalid due to incorrect reference voltage.

7. The integrated circuit of claim 5, further comprising:
    on-die instrumentation logic that determines bit errors by comparing valid bits in the speculation-high and speculation-low error data against the corresponding bits in the recovered data.

8. The integrated circuit of claim 7, wherein the on-die instrumentation logic collects and stores bit error data for a phase-voltage bin in an array of phase-voltage bins, wherein each phase-voltage bin in the array corresponds to a phase offset of said clock signal and a voltage level of said reference voltage.

9. The integrated circuit of claim 8, wherein the bit error data comprises a bit error count.

10. The integrated circuit of claim 8, wherein the on-die instrumentation logic steps the phase offset over a range of phase offsets so as to collect and store bit error counts for a row of bins in the array of phase-voltage bins.

11. The integrated circuit of claim 8, wherein the on-die instrumentation logic steps the voltage level over a range of voltage levels so as to collect and store bit error counts for a column of bins in the array of phase-voltage bins.

12. A method of obtaining bit error data for an eye-opening diagram by on-die instrumentation, the method comprising:
    selecting, by a voltage multiplexer, a reference voltage from a high reference voltage and a low reference voltage;
    selecting, by a clock multiplexer, a clock signal from an even clock signal and an odd clock signal;
    slicing an input data signal by a first sense amplifier circuit using a first slicing voltage at times indicated by said clock signal to generate a speculative-high error signal, wherein said first slicing voltage comprises said reference voltage increased by a speculative voltage; and
    slicing the input data signal by a second sense amplifier circuit using a second slicing voltage at times indicated by said clock signal to generate a speculative-low error signal, wherein said second slicing voltage comprises said reference voltage reduced by the speculative voltage.

13. The method of claim 12, further comprising:
    deserializing the speculative-high and speculation-low error signals to provide speculation-high and speculation-low error data.

14. The method of claim 12, further comprising:
    determining bits in the speculation-high and speculation-low error data that are invalid due to incorrect speculation, wherein the incorrect speculation is determined based on prior bits in recovered data obtained using a clock-data recovery and decision feedback equalizer circuit.

15. The method of claim 14, further comprising:
    generating speculation-high and speculation-low error masks that indicate the bits in the speculation-high and speculation-low error data that are invalid due to the incorrect speculation.

16. The method of claim 14, further comprising:
    determining bits in the speculation-high and speculation-low error data that are invalid due to an inappropriate reference voltage, wherein the inappropriate reference voltage is determined based on corresponding bits in the recovered data obtained using the clock-data recovery and decision feedback equalizer circuit.

17. The method of claim 16, further comprising:
    generating speculation-high and speculation-low error masks that indicate the bits in the speculation-high and speculation-low error data that are invalid due to the incorrect speculation; and modifying the speculation-high and speculation-low error masks to indicate the bits in the speculation-high and speculation-low error data that are invalid due to the inappropriate reference voltage.

18. The method of claim 16, further comprising:
determining bit errors by comparing valid bits in the speculation-high and speculation-low error data against the corresponding bits in the recovered data.

19. The method of claim 18, further comprising:
collecting and storing bit error data for a phase-voltage bin in an array of phase-voltage bins, wherein each phase-voltage bin in the array corresponds to a phase offset of said clock signal and a voltage level of said reference voltage.

20. The method of claim 19, wherein the bit error data comprises a bit error count.

21. The method of claim 19, further comprising:
stepping the phase offset over a range of phase offsets so as to collect and store bit error data for a row of bins in the array of phase-voltage bins.

22. The method of claim 19, further comprising:
stepping the voltage level over a range of voltage levels so as to collect and store bit error data for a column of bins in the array of phase-voltage bins.

23. A method performed by on-die instrumentation, the method comprising:
generating speculative-high and speculative-low error signals using first and second sense amplifiers, respectively;
deserializing the speculative-high and speculative-low error signals to generate speculative-high and speculative-low error data; and
determining bits in the speculation-high and speculation-low error data that are invalid based on prior bits in recovered data obtained using a clock-data recovery and decision feedback equalizer circuit.

24. The method of claim 23, further comprising:
determining bits in the speculation-high and speculation-low error data that are invalid due to an inappropriate reference voltage, wherein the inappropriate reference voltage is determined based on corresponding bits in the recovered data obtained using the clock-data recovery and decision feedback equalizer circuit.

25. The method of claim 24, further comprising:
determining bit errors by comparing valid bits in the speculation-high and speculation-low error data against the corresponding bits in the recovered data.

* * * * *